Patented Dec. 30, 1930

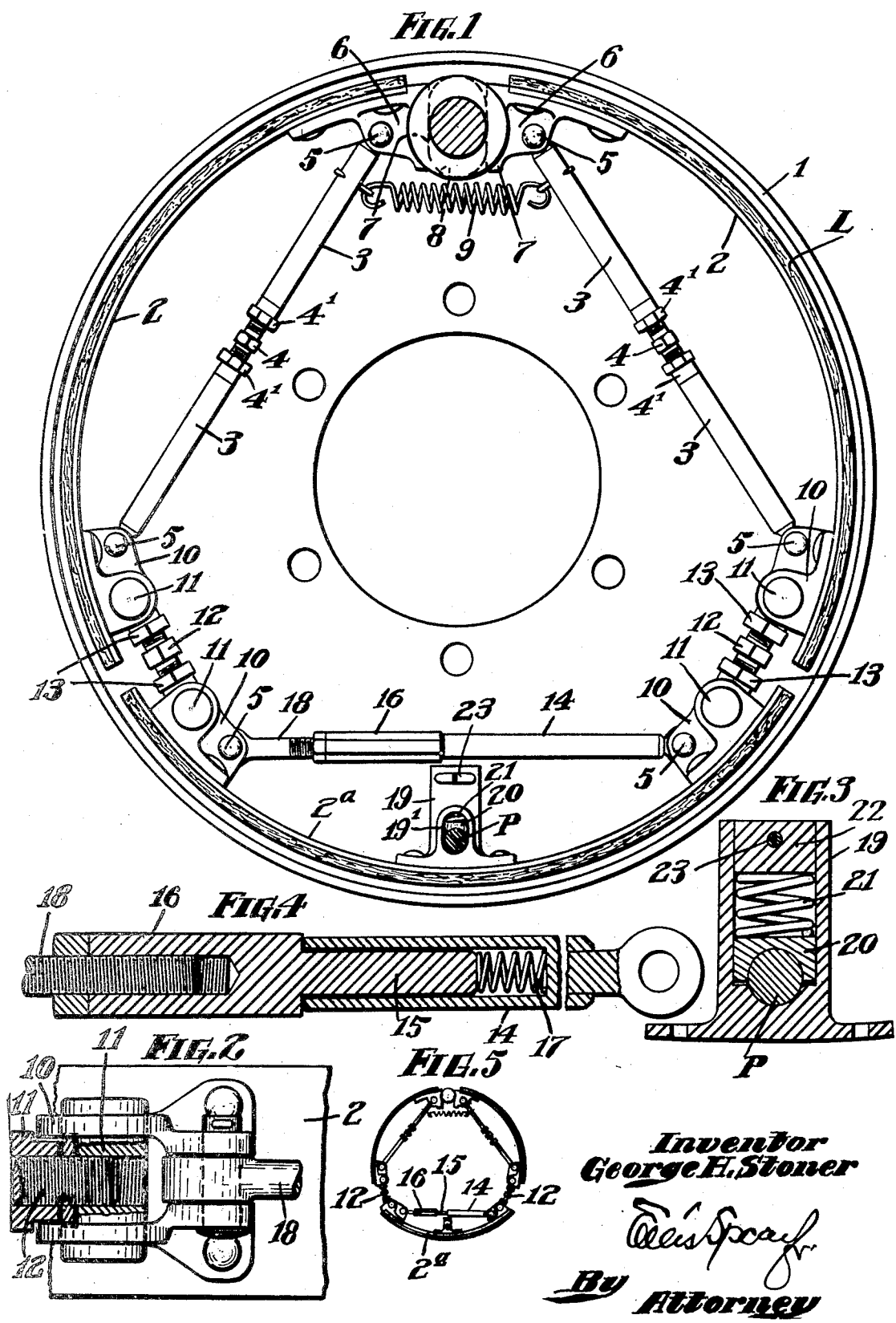

1,786,461

UNITED STATES PATENT OFFICE

GEORGE H. STONER, OF EAST BOSTON, MASSACHUSETTS, ASSIGNOR, BY MESNE ASSIGN-
MENTS TO STONER-AMES BRAKE COMPANY, INC., OF BOSTON, MASSACHUSETTS, A
CORPORATION OF MASSACHUSETTS

INTERNAL EXPANSION BRAKE

Application filed July 13, 1927. Serial No. 205,477.

In my previous patents, Reissue No. 16,-484 and No. 1,550,398, I have treated certain principles of internal brake construction and illustrated them with reference to what might be called the two-shoe type of brake. In my present application I shall deal more particularly with internal brakes involving more than two shoes and more specifically with a brake of the three-shoe type, although it also involves a flexing shoe feature which is related but independent.

While my invention is not to be limited to a three-shoe brake, that type will be shown and discussed as it illustrates certain problems involved and certain solutions offered by my invention. Previous principles of adjustment of curvature apply in part as heretofore set forth in my previous patents, and in part enter into certain new combinations as will be hereinafter described. In the drawings:

Fig. 1 is a view of a brake in accordance with my present invention in elevation and disposed within its drum.

Fig. 2 is a plan view partly in section of a bracket coupling for adjustment between shoes.

Fig. 3 is a section through the anchor pin rider.

Fig. 4 a fragmentary section through an intermediate shoe strut, and

Fig. 5 a diagrammatic view showing in somewhat exaggerated form for purposes of illustration the flattening of the lower intermediate brake sector when the braking force is applied.

Referring to the drawings I have indicated at 1 a drum of conventional design. Within this are mounted shoe members 2 and 2a which are preferably of the flexible type adjustable to curvature by the strut rods which subtend them as chords as described in my previous patents. As herein shown the strut rods are of two forms. Those subtending the terminal shoes consists of strut or chord members 3 extensible by a reversely threaded member 4 screwed into their ends and locked by nuts $4^1$.

At the cam end of these shoes the strut member 3 is pivoted as at 5 in a bracket 6 having a face 7 which is kept up against the cam 8 by a tension spring 9. At the opposite end of the terminal shoes the strut members 3 are pivoted as at 5 in a bracket 10 within which is pivoted a tapped hinge 11 receiving one end of the threaded connection 12 and held by the lock nut 13.

The hinged connections between the shoes comprising the hinge piece 11 and the threaded connection 12 constitute a double hinge or double pivoted link by reason of which the intermediate shoe 2a has a certain radial freedom as well as a freedom of end movement which permits it to flatten slightly under the pressure transmitted by the other shoes or through their strut members. The action is somewhat of a toggling nature and the result is that the intermediate shoe can be made to find the drum and to exert an equalizing pressure. In doing so it will be noted that it can move slightly radially and be slightly straightened under the resultant force transmitted when the cam 8 is operated.

The opposite end of this connection 12 is tapped into a corresponding bracket member to which is pivoted one end of a strut or chord member of slightly different construction. This member is shown in section in Fig. 4 and consists of a sleeve portion 14 within which a reduced stem 15 of a sliding member 16 is received. The small spring 17 may be confined within the member 14 and bearing against the end 15 in order to insure clearing motion, although the resiliency of the subtending shoe is under normal conditions sufficient to accommodate for play. Into this member 16 is tapped the eye bolt 18 which is pivoted in the usual manner at 5 to the adjacent bracket 10 at the opposite end of the shoe.

It will therefore be seen that this strut member for the bottom or intermediate shoe 2a is capable of being freely elongated by the intermediate shoe 2a in expanding and of being positively elongated by turning up on the member 16 to flatten the curvature of the intermediate shoe 2a where such is desired for adjustment.

In the form shown I provide an anchor pin casting 19 slotted at $19^1$ to receive the anchor pin P. The casting 19 has a vertical bore within which is mounted a shoe or rider 20 yieldingly held down by a spring 21 confined by a plug 22 held by a cotter pin 23. This member 19 which is riveted to the intermediate shoe 2a therefore supports the three shoe members of the brake on the anchor pin P out of contact with the drum. When, however, the cam 8 is actuated and the terminal shoes 2 are forced outwardly, the resultant thrust through the connections 12 give a toggling action which tends not only to force the intermediate shoe 2a downward but has a tendency to flatten it out. In practice this toggling action is very slight and I have therefore illustrated this feature diagrammatically in Fig. 5, in which the members 12 are shown as thrusting outwardly on the shoe 2a in considerable exaggeration.

It will therefore be seen that the intermediate shoe 2a can, where desired, be given a slightly shorter radius in adjustment over the terminal shoes so as to be independently flexed at the desired phase of brake application and thus give a positive and progressive setting to the intermediate shoe. At the same time a resultant back pressure is established on the terminal shoes. Furthermore, these pressures are developed with substantial uniformity on both the downward and upward rotative phases of the drum and whether the rotation is ahead or in reverse.

The initial adjustment of the shoes through the subtending chord or strut members is effected in the usual way by applying a spanner to the member 4 by lengthening or shortening the effective length of the members 3 so that any desired initial curvature may be attained or so as to take up for any wear that may occur on the lining L.

The principles herein involved are capable of various embodiments and the shoes may obviously be multiplied in number by subdivision of the shoe members or the brake might be provided with a single continuous flexible shoe member where segmental adjustment was not desired. All such modifications and variants are understood to be within the purview of my invention.

What I therefore claim and desire to secure by Letters Patent is:

1. In a brake, a pair of shoes and an intermediate shoe pivotally linked to each and a radially yieldable mount for the intermediate shoe in sustaining relation thereto.

2. In a brake, a pair of shoe members and an interposed shoe member pivotally linked to each and having a radially yieldable bearing for the anchor pin.

3. In a brake, a pair of shoe members and an interposed shoe member pivotally linked to each and a spring pressed radially acting anchor pin shoe adapted to bear on the anchor pin.

4. In an internal expansion brake, a flexible shoe member and a subtending strut therefor, said strut having a positive adjustment longitudinally and a free longitudinal extensibility independently thereof.

5. In an internal expansion brake, a flexible shoe member and a subtending strut therefor, including a threaded coupling for positive adjustment and a sliding member permissive of longitudinal expansion independent thereof.

6. In an internal expansion brake, a pair of shoe members, a pressure transmitting connection between the two, one of said shoes being flexible and means on said flexible shoe for maintaining a predetermined minimum radius of curvature while permissive of increase upon pressure of said radius of curvature.

7. In an internal expansion brake, a shoe system including an interposed flexible shoe member, means for positively controlling the contractive tendency, and connections in the shoe system, and effective upon their expansion to give a flattening resultant to the flexible shoe.

8. In an internal expansion brake, a shoe system including a flexible shoe member, means for positively controlling the contractive tendency, and hinged link connections between the flexible shoe and the adjacent shoes effective to expand the flexible shoe.

9. In an internal expansion brake, a shoe system including an interposed flexible shoe member, and connections in the shoe system, effective upon their expansion to give a flattening resultant to the flexible shoe.

10. In an internal expansion brake, a shoe system including a plurality of flexible shoe members, a radially movable pivotal support for said members, a cam for operating said shoe members, and a rigid backing for each of said shoe members disposed in pressure transmitting relation from the cam through the shoe system.

11. In a brake of the class described, an expansion member comprising a pair of terminal shoes and an intermediate shoe adapted to contact the brake drum, adjusting connections between and hinged to the ends of the intermediate shoe and the adjacent ends of the terminal shoes, respectively, and a floating spring sustained support for said intermediate brake shoe permissive of movement radially of the brake drum, and means for expanding the shoes within said drum.

12. In a brake of the class described, an expansion member comprising a pair of terminal shoes and an intermediate shoe adapted to contact with the brake drum, adjusting connections between and hinged to the ends of the intermediate shoe and the adjacent ends of the terminal shoes, respectively, an anchor pin rider on the intermediate shoe for yieldably supporting said brake shoe permissive of movement radially of the brake drum, and means for expanding the shoes within said drum.

13. In a brake of the class described, an expansion member comprising a pair of terminal shoes and an intermediate shoe adapted to contact the brake drum, adjusting connections between and hinged to the ends of the intermediate shoe and the adjacent ends of the terminal shoes, respectively, and a floating support for said brake shoes permissive of movement radially of the brake drum, and means for expanding the shoes within said drum.

In testimony whereof I affix my signature.

GEORGE H. STONER.